United States Patent [19]
Summers et al.

[11] 3,926,065
[45] Dec. 16, 1975

[54] BEVEL AND RING GEAR DRIVE

[76] Inventors: Robert S. Summers, 9190 Baseline, Alta Loma, Calif. 91701; William R. Summers, 2105 Bonita, Ontario, Calif. 91761

[22] Filed: June 26, 1974

[21] Appl. No.: 483,133

[52] U.S. Cl. .................................. 74/424; 74/417
[51] Int. Cl.² ...................... F16H 1/14; F16H 1/20
[58] Field of Search ................. 74/417, 424, 710

[56] References Cited
UNITED STATES PATENTS 2,687,653   8/1954   Almen ............................ 74/417
3,572,154   5/1969   Bartolomucci .................. 74/417 X

*Primary Examiner*—Leonard H. Gerin
*Attorney, Agent, or Firm*—Boniard I. Brown

[57] ABSTRACT

A ring gear component driven by a bevel gear wherein the ring gear component has a tension brace or support means on the bevel gear side to resist deflection of the ring gear away from the bevel gear under conditions of impact loading or heavy stress. The improved ring gear component is particularly adapjed for utilization in differential gearing utilized, for example, in the automotive field.

2 Claims, 5 Drawing Figures

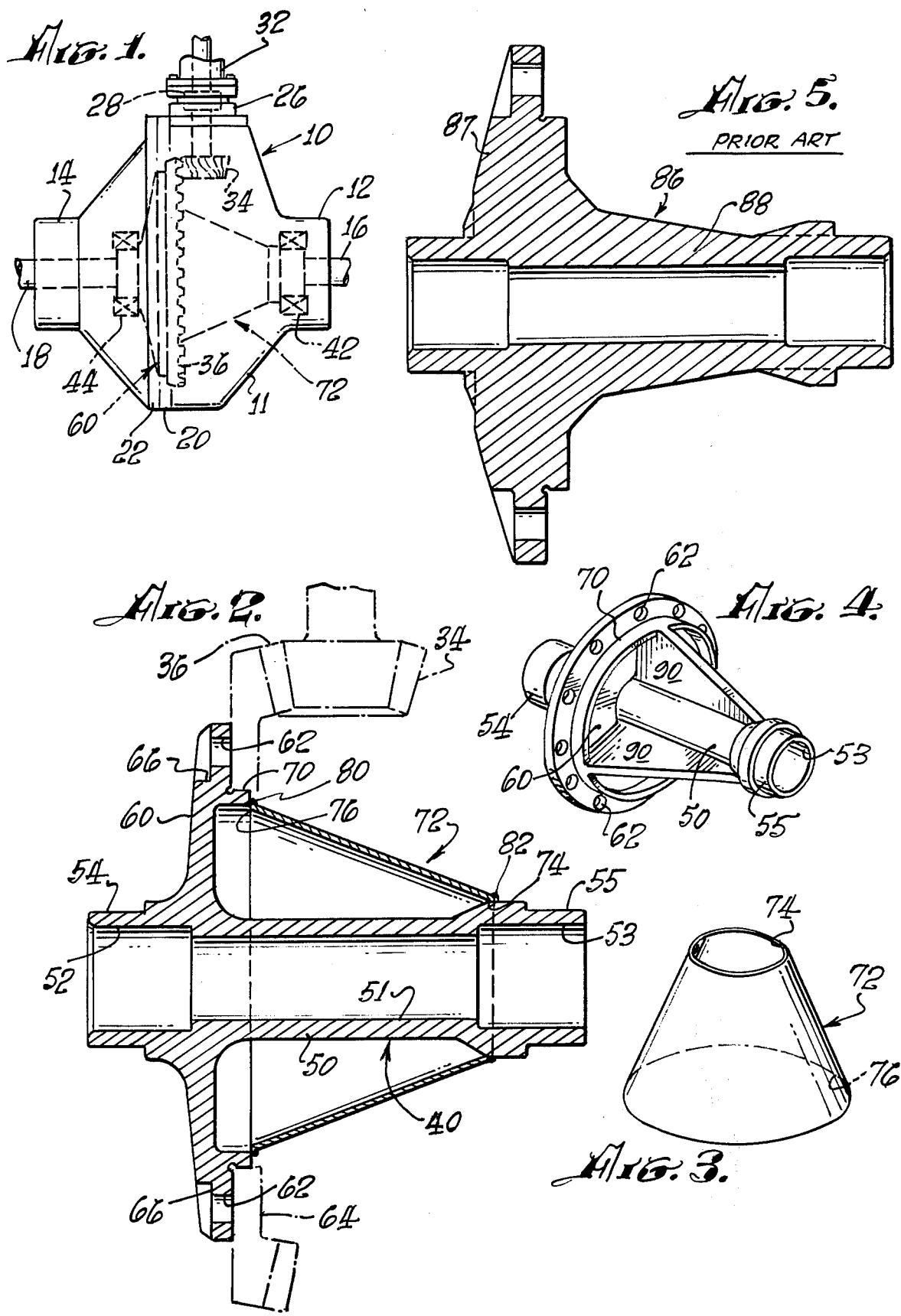

BEVEL AND RING GEAR DRIVE

BACKGROUND OF THE INVENTION

1. Field of the Invention

The field of the invention is that of gear drives such as, for example, are present in automotive equipment, the invention being more particularly adaptable in differential gearing as will be made more clear and explicit hereinafter.

2. Description of the Prior Art

The exemplary form of the invention, as described in detail hereinafter, is disclosed as being adapted as a component in the differential gear mechanism such as may be utilized in automotive equipment. Differential gears as such are, of course, well known in the art. Typically in differential gears a bevel ring gear is provided which is part of the differential mechanism, the bevel ring gear being driven by a bevel spur gear at the end of a drive shaft. There is heavy loading and stress between the bevel spur gear and the bevel ring gear. This is particularly true in equipment used in racing, wherein extremely fast starts occur, causing extremely heavy impact loading and stress as between the bevel spur gear and the bevel ring gear, the forces tending to cause the gear teeth to separate or push apart—that is, to cause the bevel ring gear to deflect away from the bevel spur gear. Certain attempts have been made in the prior art to alleviate the problem. Presently known prior art patents include U.S. Pat. Nos. 2,056,881; 2,133,112; 3,198,036; and 3,745,848. None of the approaches taken in the prior art correspond to the herein invention wherein tension brace or holding means are provided on the bevel spur gear side of the bevel ring gear for resisting and opposing the forces tending to deflect the bevel ring gear, as described in detail hereinafter.

SUMMARY OF THE INVENTION

As previously stated, the exemplary form of the invention as described in detail hereinafter is disclosed as adapted for use in a differential gear mechanism such as is typically present in automotive equipment. In the preferred exemplary form of the invention as described herein, the bevel ring gear is carried by or is an integral part of a bevel ring gear component having an axial hub which is elongated in a direction on that side of the bevel ring gear having the teeth. Tension brace or support means are provided between a position towards or adjacent the periphery of the bevel ring gear and a portion of the elongated hub part. In the preferred form of the invention this brace or tension support means takes the form of a spun steel cone welded at or adjacent to the bevel ring gear and also at the elongated hub part. In another form of the invention, instead of utilizing a spun steel cone, angularly spaced tapered bracing tension webs are utilized as described more in detail hereinafter.

In the light of the foregoing, the primary object of the invention is to provide improved light-weight means for overcoming the problem described in the foregoing of deflection of the bevel ring gear away from the bevel spur gear under load.

Another object is to provide a specific means for realizing the foregoing object by the provision of a ring gear component having an elongated hub part with light-weight tension bracing means secured, as by welding, adjacent to the hub part and extending to and welded to an outer part of the bevel ring gear, thus to oppose and resist tension loading tending to deflect the bevel ring fear away from the bevel drive or spur gear.

Another object is to provide mechanism for realizing the desired objective, comprised of angularly spaced tapered bracing webs secured to the hub of the bevel gear component and to the bevel gear itself or a supporting member for the bevel ring gear.

Further objects and additional advantages of the invention will become apparent from the following detailed description and annexed drawings wherein:

BRIEF DESCRIPTION OF THE DRAWINGS

FIG. 1 is a schematic view of a differential gear housing having the preferred form of the invention embodied therein.

FIG. 2 is a sectional view of the bevel ring gear and the support component, showing the bevel ring gear and the bevel spur gear or drive pinion in broken lines;

FIG. 3 is a perspective view of the spun steel cone of the assembly of FIG. 2;

FIG. 4 is a perspective view of a modified form of the invention utilizing angularly spaced tapered bracing webs rather than the spun steel cone;

FIG. 5 is a sectional view of a known prior art ring gear component.

DESCRIPTION OF THE PREFERRED EMBODIMENT

Referring to FIG. 1, numeral 10 designates generally a differential gear housing of a type that may be utilized in various kinds of automotive equipment. Inasmuch as differential gears as such are well known in the art, FIG. 1 is schematic, showing only essentially the parts constituting the present invention. The housing 11 has extending bosses 12, 14 which have bores or axial shafts 16 and 18. The housing typically is made in two halves joined together at the position of flanges 20 and 22.

At the top of the housing, as seen in FIG. 1, is a fitting 26 which is secured to the housing by cap screws, for example, this housing having in it a journal 28 providing a bearing for drive or propeller shaft 32 on the end of which, within the housing, is the bevel spur gear or pinion drive gear 34. The bevel spur or pinion gear 34 meshes with bevel ring gear 36. The bevel ring gear 36 is carried by a ring gear component designated generally at 42 in FIG. 2. In FIG. 1, within the housing 10 of the differential gear mechanism there are recesses for journal bearings 42 44 in which are journalled parts of the differential gear mechanism; for schematic exemplary purposes the bevel gear component 40 may be considered to be journalled in these bearings.

The bevel ring gear component 40 comprises an elongated hub part 50 having a bore 51 and end counter-bores 52 and 53. The end parts have slightly reduced outside diameters, as designated at 54 and 55, providing annular shoulders, as shown, adapted for journalling the component in the journal bearings. Component 40 has a circular web support part 60 having angularly spaced peripheral bores, as designated at 62. The bevel ring gear itself may be of typical construction and is shown in phantom outline at 64. The ring gear itself, as in typical constructions, is secured on the member 60 by means of belts (not shown) extending through holes 62. On one side of the web 60 there is provided a flat 66 and on the inside at a lesser diameter is an extending annular flange 70 forming a shoulder which receives the interior diameter of the bevel ring gear member 36. The teeth of the bevel spur or drive pinion 34 mesh with the teeth of the bevel ring gear 36, as shown.

Numeral 72 designates a light-weight spun steel cone member, shown in detail in FIG. 3. At one end it has a circular edge 74 and at the other end a larger circular edge 76. The cone is shown in position in FIG. 2 with the end of larger circular edge 76 welded to the annular flange 70 at 80. The end of the smaller circular edge fits around the end section of the hub portion 50 and is welded thereto, as shown at 82.

The spun cone member 72 forms a tension bracing member, the purposes and capabilities of which can be understood by brief reference to known prior art. A known prior art bevel ring gear component is designated at 86 in FIG. 5. To the extent that the component 86 has similarities to the component 40, these parts need not be described in detail. In order to tend to resist deflection of the bevel ring gear, in comparison with the structure according to the present invention, the web support part 87 is much thicker and therefore much heavier, and the body part 88 has a taper and is much thicker walled, with the result that it is much heavier. Weight is an extremely important factor, particularly in connection with racing equipment. It is to be noted that in the construction of FIG. 5, there is no part of the construction positioned to resist tension force at an outward position on the circular web part 87.

Referring again to FIGS. 1, 2 and 3, the spun cone 72 is uniform throughout, there being no axial weld. It provides a tension resisting or opposing force preventing leftward deflection of the bevel ring gear away from the teeth of the drive pinion 34. It is to be realized, of course, that heavy forces or stresses occur between the teeth of the gears, tending to cause them to separate, that is, tending to force the bevel ring gear to deflect away from the teeth of the bevel drive pinion. It is extremely important that this deflection be avoided. The cone 72 serves this purpose, insuring continued close fitting and accuate meshing of the teeth of the drive pinion gear with the teeth of the bevel ring gear. The cone or bracing prevents or greatly reduces the sudden deflection from impact loading on the bevel ring gear which would otherwise occur during the very rapid application of power in a racing start. Loose fit between the gear teeth is avoided. It is to be recognized that this has been a well-known problem in equipment subjected to heavy starting loads applied to the bevel ring gear, such as occur regularly in racing equipment. The construction according to the invention, such as cone 72, assures close tight fitting and meshing of the gears.

FIG. 4 shows a modified form of the invention wherein parts that correspond to and are like parts of the previous embodiment are identified by the same reference character. In this form of the invention the spun cone is not utilized. Instead tapered webs or vane-like bracing elements as shown at 90 are utilized. These webs are triangular in shape as shown, being right triangles with one side or edge welded to the hub portion 50 with the tapered web becoming wider in extent towards the ring gear support member 60, as shown to which it is also welded. Three or more of the web braces may be utilized equally spaced from each other as shown. These webs serve to resist deflection of the ring gear support. The webs provide the purpose and function previously described relating to the cone 72.

From the foregoing those skilled in the art will readily understand and appreciate the nature and construction of the invention and the manner in which it realizes and achieves all of the objectives as set forth in the foregoing. As known in the racing field, deflection of the bevel ring gear or its support can result in gear breakage and lost races, a result which it is, of course, very desirable to overcome. It may be pointed out that the constructions of the invention as described are very considerably lighter than any known prior art constructions, in addition to being constructionally unique.

The foregoing disclosure is representative of the preferred forms of the invention and is to be interpreted in an illustrative rather than an limiting sense, the invention to be accorded the full scope of the claims appended hereto.

What is claimed as new in support of Letters Patent is:

1. A bevel ring gear component comprising:
    an elongate generally circular hub,
    web means surrounding and extending radially out from said hub in a plane transverse to and spaced a distance from one end of the hub,
    a bevel ring gear disposed circumferentially about and rigid on said web means and having a circular row of bevel gear teeth coaxial with and facing said one end of said web, and
    bracing means extending between and rigidly joined to said web means closely adjacent said ring gear and to said one hub end in a manner such that said bracing means extends between said web means and hub at an oblique angle to the hub and acts in tension to resist deflection of said web means in the direction of the opposite end of said hub under the thrust in said direction of a gear mating with said ring gear.

2. A bevel ring gear component according to claim 1 wherein:
    said bracing means comprises a hollow shell-like bracing cone coaxially surrounding said hub with the large cone end adjacent and joined to said web means close to said ring gear and the small cone end joined to said hub adjacent said one hub end.

* * * * *